United States Patent
Breau et al.

(10) Patent No.: US 8,326,305 B2
(45) Date of Patent: Dec. 4, 2012

(54) SYSTEMS AND METHODS FOR SELECTIVELY PRE-REGISTERING DATA PATHS FOR MOBILE STATIONS

(75) Inventors: Jeremy R. Breau, Leawood, KS (US); Len I. Mosley, Herndon, VA (US); Ojas T. Choski, Herndon, VA (US); Chunmei Liu, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 637 days.

(21) Appl. No.: 12/508,694

(22) Filed: Jul. 24, 2009

(65) Prior Publication Data

US 2011/0021198 A1 Jan. 27, 2011

(51) Int. Cl.
*H04W 36/00* (2009.01)
(52) U.S. Cl. ........................... 455/437; 455/436
(58) Field of Classification Search .................. 370/331, 370/332; 455/432.1, 435.1, 435.2, 436, 437, 455/438
See application file for complete search history.

(56) References Cited

U.S. PATENT DOCUMENTS

| | | | | |
|---|---|---|---|---|
| 5,640,676 | A * | 6/1997 | Garncarz et al. | 455/436 |
| 7,512,403 | B2 * | 3/2009 | Rajkotia et al. | 455/438 |
| 7,773,991 | B2 * | 8/2010 | Osterling et al. | 455/436 |
| 2007/0149196 | A1 * | 6/2007 | Choi et al. | 455/436 |
| 2008/0049676 | A1 * | 2/2008 | Xiang | 370/331 |
| 2008/0104192 | A1 | 5/2008 | Xie | |
| 2009/0257398 | A1 * | 10/2009 | Koyanagi et al. | 370/331 |

OTHER PUBLICATIONS

Jeffrey G. Andrews et.al, "Fundamentals of WiMAX, Understanding Broadband Wireless Networking," Chapter 10, Pearson Education, Inc., 2007.
WiMAX Forum Network Architecture, "(Stage 2: Architecture Tenets, Reference Model and Reference Points), 3GPP2—WiMAX Interworking," WiMAX Forum, Jan. 11, 2008.
WiMAX Forum Network Architecture, "(Stage 2: Architecture Tenets, Reference Model and Reference Points), Part 1," WiMAX Forum, Jan. 11, 2008.
WiMAX Forum Network Architecture, "(Stage 2: Architecture Tenets, Reference Model and Reference Points), Part 2," WiMAX Forum, Jan. 11, 2008.
WiMAX Forum Network Architecture, "(Stage 2: Architecture Tenets, Reference Model and Reference Points), Part 3—Informative Annex," WiMAX Forum, Jan. 11, 2008.

(Continued)

*Primary Examiner* — Meless N Zewdu
*Assistant Examiner* — Michael S Bush
(74) *Attorney, Agent, or Firm* — McDonnell Boehnen Hulbert & Berghoff LLP

(57) ABSTRACT

The present invention relates to systems and methods for selectively pre-registering a data path for a mobile station. In an embodiment, a serving base station receives a mobile-originated handoff-request message from a mobile station, wherein the mobile-originated handoff-request message identifies one or more target base stations. The serving base station then responsively determines whether to instruct each respective target base station to pre-register a data path for the mobile station. The serving base station then sends a respective serving-to-target handoff-request message to each identified target base station, indicating whether the serving base station is instructing that target base station to pre-register a data path for the mobile station.

17 Claims, 4 Drawing Sheets

OTHER PUBLICATIONS

WiMAX Forum Network Architecture, "(Stage 3: Detailed Protocols and Procedures), Annex: WiMAX—3Gpp2 Interworking," WiMAX Forum, Jan. 11, 2008.

WiMAX Forum Network Architecture, "(Stage 3: Detailed Protocols and Procedures), Annex: Prepaid Accounting," WiMAX Forum, Jan. 11, 2008.

WiMAX Forum Network Architecture, "(Stage 3: Detailed Protocols and Procedures), Annex: R6/R8 ASN Anchored Mobility Scenarios," WiMAX Forum, Jan. 11, 2008.

WiMAX Forum Network Architecture, "(Stage 3: Detailed Protocols and Procedures)" WiMAX Forum, Jan. 11, 2008.

* cited by examiner

SYSTEMS AND METHODS FOR SELECTIVELY PRE-REGISTERING DATA PATHS FOR MOBILE STATIONS

BACKGROUND

Many people use mobile stations, such as cell phones and personal digital assistants, to communicate with cellular wireless networks, which typically provide communication services such as voice, text messaging, and packet-data communication. These mobile stations and networks typically communicate with each other over a radio frequency (RF) air interface according to a wireless protocol. Mobile stations typically conduct wireless communications with one or more base stations, each of which are arranged to send communications to and receive communications from mobile stations over the RF air interface.

As a mobile station moves between coverage areas or when network conditions change or for other reasons, the mobile station may request to be "handed off" from operating in one coverage area to operating in another coverage area.

Overview

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, with 802.16e being the current version of the standard (the terms "[IEEE] 802.16," "[IEEE] 802.16e," and "WiMAX" may be used interchangeably herein). WiMAX provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security.

WiMAX chipsets that provide for communication in accordance with the WiMAX protocol are becoming increasingly prevalent as standard or optional equipment not only in traditional wireless communications devices, such as cellular phones and personal digital assistants, but also in devices that, heretofore, were not used for access to telephony networks. These devices include portable music players, entertainment devices such as game players, automobiles, domestic appliances and so on.

In a WiMAX network, a BS is communicatively connected with a network entity such as a access service network gateway (ASN-GW), which may assist in providing various services, such as service-flow authorization, paging, radio-resource management, and handover. The ASN-GW may interface with one or more core packet data networks and/or the global Internet. As such, mobile stations can typically communicate over the one or more signaling and/or transport networks from anywhere inside the coverage area of one or more base stations, via the base station and the ASN-GW.

Using a mobile station as an example—and a common one at that—of a WiMAX device, data packets sent to or from the mobile station travel through a "data path," which usually extends between a serving base station and the ASN-GW. In current implementations, when the mobile station requests to be handed off to a different coverage area, the serving base station instructs all target base stations to pre-register a data path for a mobile station to ensure that, when the handoff is complete, the mobile station will have an established data path.

The present invention relates to systems and methods for selectively pre-registering at least one data path for a mobile station. In an embodiment of the invention, a serving base station receives a mobile-originated handoff-request message from a mobile station, where that message identifies one or more target base stations. The serving base station then responsively determines whether to instruct each respective target base station to pre-register a data path for the mobile station, and sends a respective serving-to-target handoff-request message to each identified target base station. Each serving-to-target handoff-request message indicates whether the serving base station is instructing that target base station to pre-register a data path for the mobile station.

In another embodiment of the invention, a serving base station maintains a record that comprises an identification of a given target base station, as well as a number of times mobile stations being served by the serving base station have handed off to the given target base station. The serving base station may update the record whenever a mobile station indicates that it is handing off to the given target base station. Subsequently, when the serving base station receives a mobile-originated handoff-request message from a mobile station that identifies the given target base station, the serving base station may use the record to determine whether to instruct the given target base station to pre-register a data path for the mobile station.

These as well as other aspects and advantages will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

BRIEF DESCRIPTION OF THE DRAWINGS

An embodiment of the present invention is described herein with reference to the drawings, in which.

DETAILED DESCRIPTION

Figure 1:
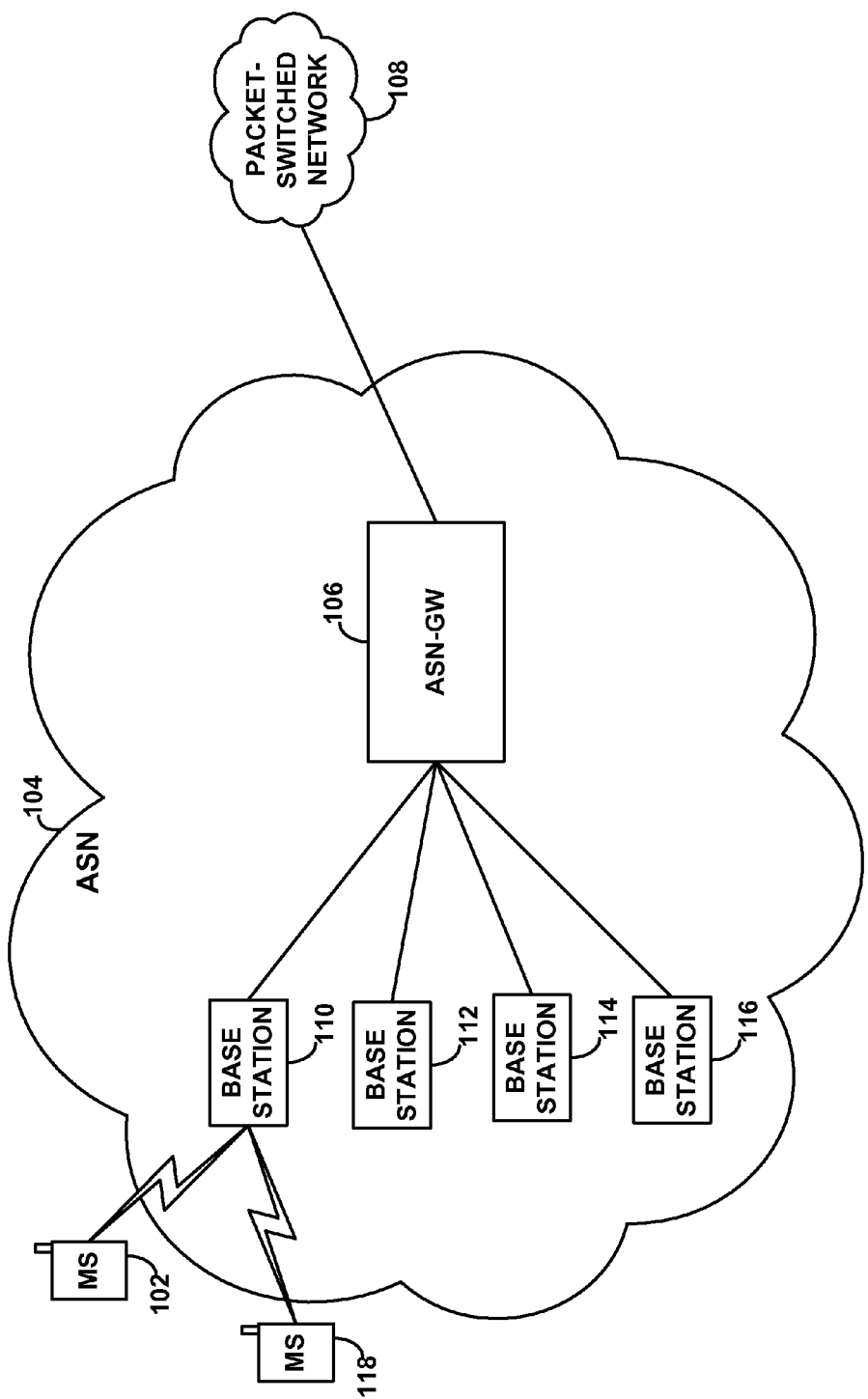
FIG. 1 is a simplified block diagram of a communication system in which an embodiment of the invention can be carried out.

Referring to the drawings, FIG. 1 depicts a WiMAX communication system in which aspects of an embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine-language instructions stored in data storage and executed by a processor), firmware, and/or hardware.

As shown in FIG. 1, the example WiMAX communication system includes an access service network (ASN) 104 and a packet-switched network 108. Located on ASN 104 are mobile stations 102 and 118, an ASN-GW 106, and base stations 110, 112, 114, and 116.

ASN 104 may provide WiMAX connectivity for mobile station 102 and 118, and may manage mobility-related functions, such as handover and mobile-IP foreign-agent support.

Mobile stations 102 and 118 may communicate over an air interface with base station 110, 112, 114, and/or 116. In FIG. 1, mobile stations 102 and 118 are being served by base station 110 (thus base station 110 may be referred to herein as serving base station 110) and may hand off to any of base stations 112, 114, and 116 (thus base stations 112, 114, and 116 may be referred to herein as target base stations 112, 114, and 116). Base stations 110, 112, 114, and 116, are coupled to ASN-GW 106, which provides connectivity to packet-switched network 108.

Base stations 110, 112, 114, and 116 may include directional antennas, power amplifiers, transceiver equipment and/or any other suitable equipment for communicating with mobile stations 102 and 118 using the WiMAX protocol (and/or other protocols). Note that any or all of base stations 110, 112, 114, and 116 as used herein may represent base stations in their entirety, but may just as well represent one or more sectors having one or more frequency assignments for implementing a WiMAX interface with mobile stations 102 and 118. In addition, each sector may have allocated to it a distinct set of downlink channels for transmitting signals to mobile stations 102 and 118 and a distinct set of uplink channels that mobile stations 102 and 118 may use for transmitting signals to the base station. And other possibilities exist as well without departing from the invention.

Base stations 110, 112, 114, and 116 may emit a pilot signal on each sector, typically at a power level higher than other downlink signals. And each mobile station may regularly measure the strength of each pilot signal that it receives, and notify serving base station 110, for instance, when the signal strength of a given pilot signal falls above or below designated thresholds. Mobile stations 102 and 118 may notify serving base station 110 of the strength of each pilot signal that it receives by using a pilot-signal-strength message. Serving base station 110, in turn, may provide mobile stations 102 and 118 with an updated list of active pilots (e.g., an active set).

Base stations 110, 112, 114, and 116 may each include a data-path function entity, such as a serving and/or target data-path function entity, and accordingly assist in managing and setting up data paths for mobile stations 102 and 118. Typically, a data path extends between a base station and an ASN-GW. Base stations 110, 112, 114, and 116 may also assist in creating tunnels with various entities for packet forwarding. And these base stations may also carry out one or more other data-path-related functions.

Serving base station 110 may assist mobile stations (such as mobile stations 102 and 118) in selectively handing off to target base stations 112, 114, and 116. As discussed in greater detail below, after receiving a handoff-request message from mobile station 102, serving base station 110 may determine whether to instruct each of target base stations 112, 114, and 116 to pre-register a data path for mobile station 102.

Either or both of mobile stations 102 and 118 may be a cell phone, a wirelessly-equipped personal data assistant (PDA), a laptop or any other type of wirelessly-equipped device now known or later developed. Either or both of mobile stations 102 and 118 may be equipped with hardware, software, and/or other logic to communicate using WiMAX and/or one or more other protocols.

ASN-GW 106 may assist in providing various WiMAX services, such as authentication, authorization, and accounting (AAA), context management, profile management, service-flow authorization, paging, radio-resource management, and handover, perhaps among one or more other services.

Figure 2:
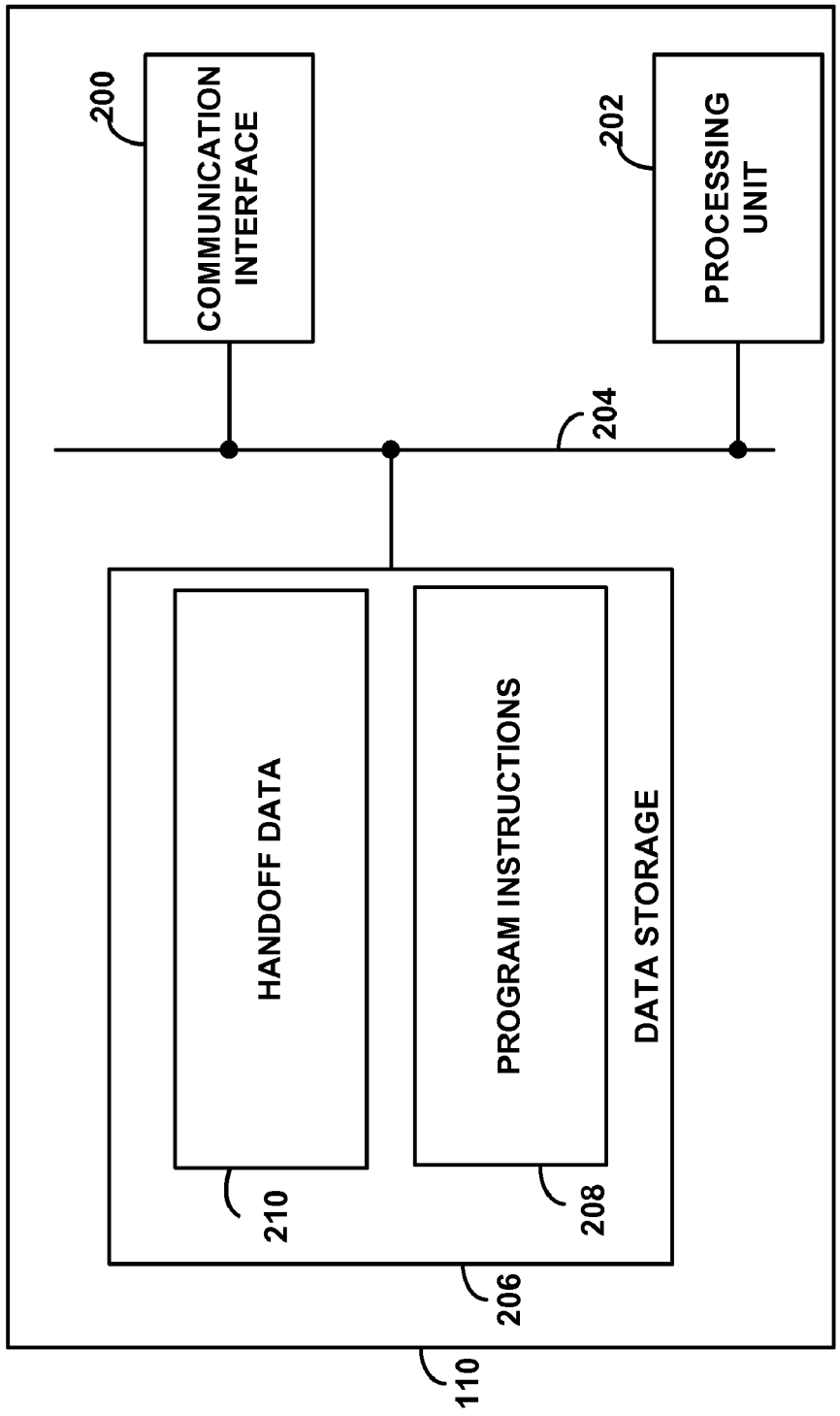
FIG. 2 is a simplified block diagram of a base station arranged to implement aspects of embodiments of the invention.

FIG. 2 is a simplified block diagram depicting a selection of possible functional components of serving base station 110. As shown, serving base station 110 includes by way of example a communication interface 200, a processing unit 202, and data storage 206, coupled together by a system bus, network, or other connection mechanism 204.

Communication interface 200 may include one or more communication interface mechanisms that enable the entity to communicate with various other entities. As such, the communication interface may take various well-known forms, depending on factors such as the type of communication links in use.

Processing unit 202 may comprise one or more general-purpose processors (e.g., INTEL processors) and/or one or more specialized processors (e.g., digital signal processors and/or application specific integrated circuits). And data storage 206 may comprise one or more volatile and/or non-volatile storage components, such as optical, magnetic, or organic storage components, and may be integrated in whole or in part with processing unit 202.

As shown, data storage 206 may hold program instructions 208 and handoff data 210, perhaps among one or more other types of data. The program instructions 208 may comprise machine-language instructions executable by processing unit 202 to carry out various functions described herein. Handoff data 210 may comprise data used by serving base station 110 in determining whether to instruct any of target base stations 112, 114, and 116 to pre-register a data path for mobile stations 102 and/or 118. By way of example, handoff data 210 may include a record that comprises an identification of target base stations, along with the number of times that mobile stations being served by base station 110 have handed off to each of those target base stations. As another example, handoff data 210 may comprise the contents of a pilot-signal-strength message received from mobile stations 102 and/or 118. A given pilot-signal-strength message may include a measurement of a pilot signal emitted by any of base stations 110, 112, 114, and 116. As yet another example, handoff data 210 may include a quality-of-service (QoS) subscriber profile for mobile station 102. As another example, handoff data 210 may include a distance between serving base station 110 and target base stations 112, 114, and 116. And certainly other examples are possible as well.

Figure 3:
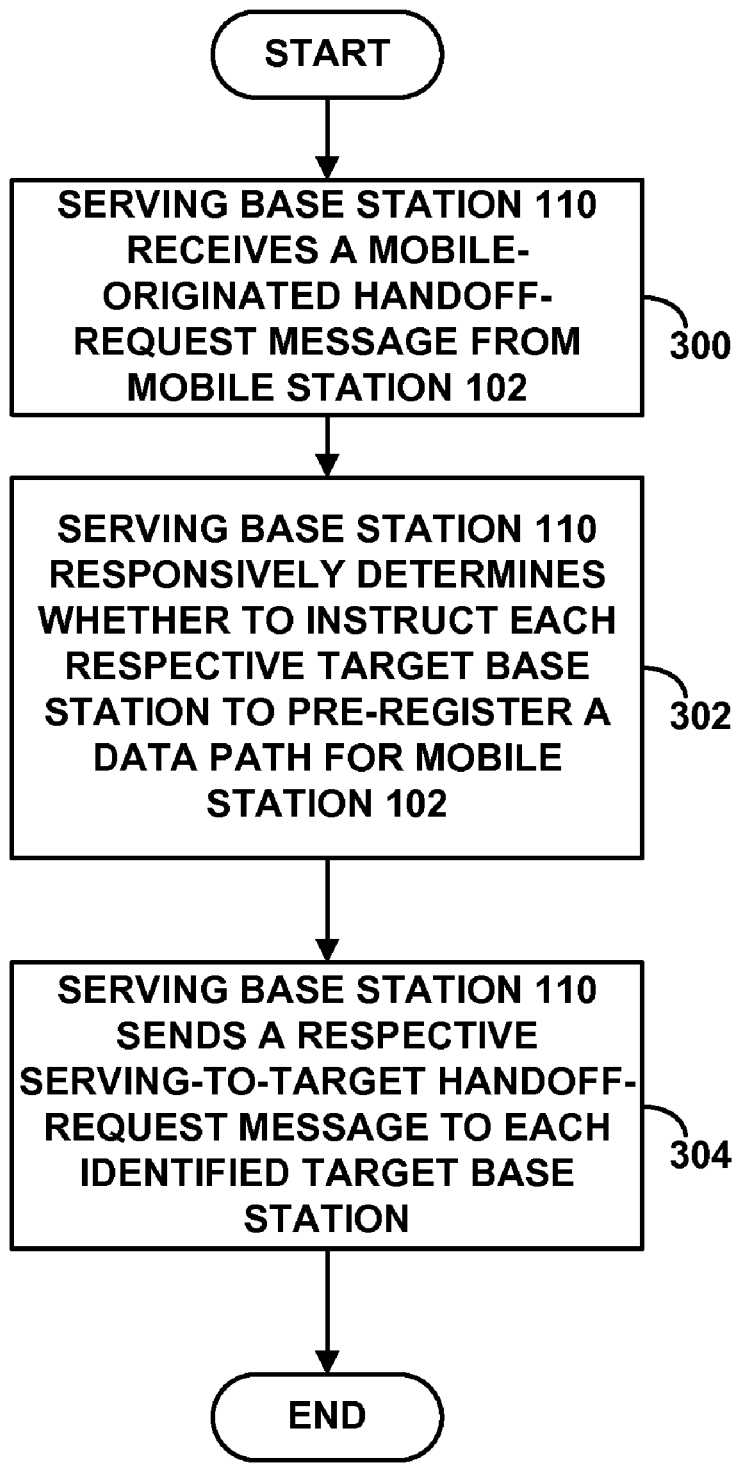
FIG. 3 is a simplified flow chart depicting functions that can be carried out in accordance with an embodiment of the invention.

FIG. 3 is a flow chart depicting in summary a set of functions that can be carried out in accordance with an embodiment of the invention. Generally, FIG. 3 depicts a method for selectively pre-registering a data path for mobile station 102. As shown in FIG. 3, at block 300, serving base station 110 receives a mobile-originated handoff-request message from mobile station 102. The mobile-originated handoff-request message may be a MOB_MSHO-REQ message, and may include an identification of one or more potential target base stations (for example, target base stations 112, 114, and 116). At block 302, upon receipt of the mobile-originated handoff-request message, serving base station 110 responsively determines whether to instruct each respective target base station (from the message) to pre-register a data path for mobile station 102.

There are several ways in which base station 110 may determine whether to instruct each such respective target base station to pre-register a data path for the mobile station. For example, serving base station 110 may use information contained in a pilot-signal-strength message received from mobile station 102 to determine which target base station to instruct to pre-register a data path for mobile station 102. Base station 110 may compare the measurement of the pilot signal emitted by a given target base station to a threshold value, and determine to instruct the given target base station to pre-register a data path for mobile station 102 when the measurement of the pilot signal is above a threshold value.

As another example, serving base station 110 may identify a QoS subscriber profile for mobile station 102. Serving base station 110 may obtain the QoS subscriber profile from an entity such as a AAA server (not shown), or from ASN-GW 106, among many other options. The QoS subscriber profile may include certain criteria (such as a service priority parameter for mobile station 102), which serving base station 110 may use to determine whether to instruct a given target base station to pre-register a data path for mobile station 102. If the QoS subscriber profile meets a certain predetermined criteria, serving base station 110 may determine to instruct a given target base station to pre-register a data path for mobile station 102. In some embodiments, if the QoS subscriber profile meets certain criteria, serving base station 110 may determine to instruct all target base stations to pre-register a data path for mobile station 102. In some embodiments, if the QoS subscriber profile meets certain criteria, serving base station 110 may determine not to instruct any target base stations to pre-register a data path for mobile station 102. And many other possibilities exist as well, without departing from the invention.

As yet another example, serving base station 110 may use the distance between serving base station 110 and a given target base station when determining whether to instruct the given target base station to pre-register a data path for mobile station 102. For example, when determining whether to instruct target base station 112 to pre-register a data path for mobile station 102, serving base station 110 may determine the distance between itself and target base station 112 (this information may inputted to base station 110 by an engineering technician, or may be received by other means). Serving base station 110 may determine to instruct target base station 112 to pre-register a data path for mobile station 102 when the distance between serving base station 110 and target base station 112 is below a threshold value.

In another example, serving base station 110 may use the distance between mobile station 102 and a given target base station when determining whether to instruct the given target base station to pre-register a data path for mobile station 102. For example, when determining whether to instruct target base station 112 to pre-register a data path for mobile station 102, serving base station 110 may determine the distance between target base station 112 and mobile station 102 (this information may obtained using known location-determination techniques, such as GPS). Serving base station 110 may determine to instruct target base station 112 to pre-register a data path for mobile station 102 when the distance between mobile station 102 and target base station 112 is below a threshold value.

Returning to FIG. 3, at block 304, serving base station 110 sends a respective serving-to-target handoff-request message to each identified target base station (in this example, target base stations 112, 114, and 116). The serving-to-target handoff-request message may be an HO_Req message, and may include a "Pre-Reg" field that indicates whether the serving base station is instructing that target base station to pre-register a data path for the mobile station. For example, setting the Pre-Reg field to "1" could indicate that the serving base station is instructing the target base station to pre-register a data path for mobile station 102. Conversely, setting the Pre-Reg field to "0" could indicate that the serving base station is instructing the target base station not to pre-register a data path for mobile station 102.

Figure 4:
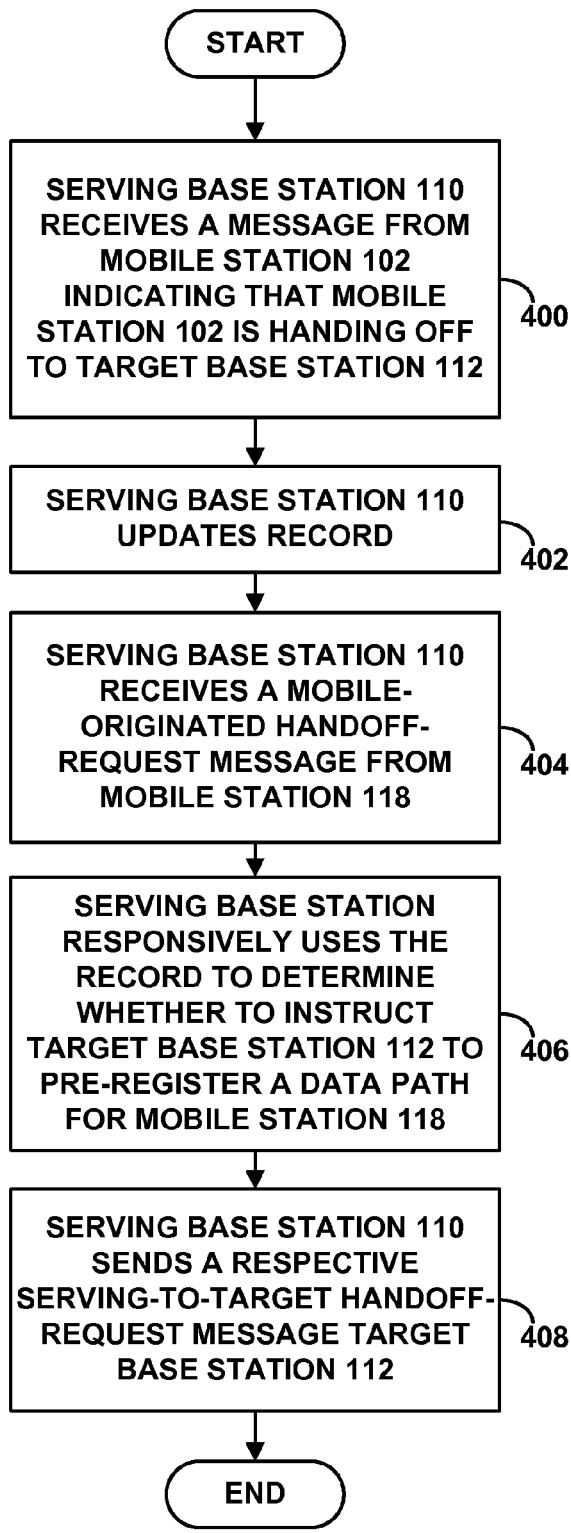
FIG. 4 is a simplified flow chart depicting functions that can be carried out in accordance with an embodiment of the invention.

FIG. 4 is a flow chart depicting in summary a set of functions that can be carried out in accordance with an embodiment of the invention. Generally, FIG. 4 depicts a method for selectively pre-registering a data path for mobile station 102. In this embodiment, serving base station 110 maintains a record in handoff data 210 that comprises (i) an identification of a target base station, and (ii) a number of times mobile stations being served by the serving base station have handed off to the target base station. As shown in FIG. 4, at block 400, serving base station 110 receives a message from mobile station 102 that indicates that mobile station 102 is handing off to a specified target base station (in this example, target base station 112). The message may be a MOB_HO-IND message. At block 402, upon receipt of the MOB_HO-IND message, serving base station 110 updates the record by increasing by one the number of times mobile stations being served by serving base station 110 have handed off to target base station 112.

At block 404, serving base station 110 receives a mobile-originated handoff-request message from mobile station 118. The mobile-originated handoff-request message may be a MOB_MSHO-REQ message, and includes an identification of target base station 112. At block 406, serving base station 110 responsively uses the record maintained in handoff data 210 to determine whether to instruct target base station 112 to pre-register a data path for the mobile station 118. For example, if the record meets a specified criteria (such as a minimum number of times that mobile stations have handed off to target base station 112), then serving base station 110 may determine to instruct target base station 112 to pre-register a data path for mobile station 118.

At block 408, serving base station 110 sends a serving-to-target handoff-request message to target base station 112. The serving-to-target handoff-request message may be a HO_Req message, and may include a Pre-Reg field that indicates whether serving base station 110 is instructing target base station 112 to pre-register a data path for mobile station 118. For example, setting the Pre-Reg field to "1" may indicate that serving base station 110 is instructing target base station 112 to pre-register a data path for mobile station 118. Conversely, setting the Pre-Reg field to "0" may indicate that serving base station 110 is instructing target base station 112 not to pre-register a data path for mobile station 118. And other modes of conveying such an instruction could be used as well, without departing from the invention.

Example embodiments of the present invention have been described above. Those skilled in the art will understand, however, that changes and modifications may be made to these embodiments without departing from the true scope and spirit of the invention, which is defined by the claims.

We claim:

1. A method for pre-registering at least one data path for a mobile station, the method comprising:

a serving base station receiving a mobile-originated handoff-request message from a mobile station, wherein the mobile-originated handoff-request message identifies a plurality of target base stations;

the serving base station responsively determining whether to instruct each respective target base station to pre-register a data path for the mobile station; and in response to the determining whether to instruct, the serving base station (i) sending to at least one of the identified target base stations a serving-to-target handoff-request message that indicates that the serving base station is instructing that target base station to pre-register a data path for the mobile station, and (ii) sending to at least one of the identified target base stations a serving-to-target handoff-request message that indicates that the serving base station is instructing that target base station not to pre-register a data path for the mobile station.

2. The method of claim 1, wherein the serving base station responsively determining whether to instruct a given target base station to pre-register a data path for the mobile station comprises:

the serving base station receiving a pilot-signal-strength message from the mobile station, wherein the pilot-signal-strength message comprises a measurement of a pilot signal emitted by the given target base station; and the serving base station determining to instruct the given target base station to pre-register a data path for the mobile station when the measurement of the pilot signal emitted by the given target base station is above a threshold value.

3. The method of claim 1, wherein the serving base station responsively determining whether to instruct a given target base station to pre-register a data path for the mobile station comprises:

the serving base station identifying a quality of service (QoS) subscriber profile for the mobile station; and the serving base station determining to instruct the given target base station to pre-register a data path for the mobile station when the QoS subscriber profile meets one or more predetermined criteria.

4. The method of claim 1, wherein the serving base station responsively determining whether to instruct a given target base station to pre-register a data path for the mobile station comprises:

the serving base station determining a likelihood that the mobile station will hand off to the given target base station; and the serving base station determining to instruct the given target base station to pre-register a data path for the mobile station when the determined likelihood is above a threshold value.

5. The method of claim 1, wherein the serving base station responsively determining whether to instruct a given target base station to pre-register a data path for the mobile station comprises:

the serving base station determining a distance between the serving base station and the given target base station; and the serving base station determining to instruct the given target base station to pre-register a data path for the mobile station when the distance between the serving base station and the given target base station is below a threshold value.

6. The method of claim 1, further comprising:

each identified target base station receiving a serving-to-target handoff-request message, and responsively using the received serving-to-target handoff-request message to determine whether to pre-register a data-path for the mobile station.

7. The method of claim 6, further comprising:

each identified target base station sending a data-path-request message to an access service network gateway when the respective received serving-to-target handoff-request message indicates that the serving base station is instructing the identified target base station to pre-register a data path for the mobile station.

8. The method of claim 7, further comprising:

the access service network gateway receiving the data-path-request message from the one or more identified target base stations, and responsively sending a data-path-reply message to each such target base station, wherein each data-path-reply message establishes that a path for data-packet communication has been pre-registered.

9. A system comprising:

a communication interface;

a processing unit;

data storage; and program logic stored in the data storage and executable by the processing unit to (i) receive a mobile-originated handoff-request message from a mobile station, wherein the mobile-originated handoff-request message identifies a plurality of target base stations, (ii) responsively determine whether to instruct each respective target base station to pre-register a data path for the mobile station, (iii) send to at least one of the identified target base stations, a serving-to-target handoff-request message indicates that the serving base station is instructing that target base station to pre-register a data path for the mobile station, and (iv) send to at least one of the identified target base stations a serving-to-target handoff-request message that indicates that the serving base station is instructing the target base station not to pre-register a data path for the mobile station.

10. The system of claim 9, wherein the program logic executable by the processing unit to determine whether to instruct a given target base station to pre-register a data path for the mobile station comprises:

program logic executable by the processing unit to (i) receive a pilot-signal-strength message from the mobile station, wherein the pilot-signal-strength message comprises a measurement of a pilot signal emitted by the given target base station, and (ii) determine to instruct the given target base station to pre-register a data path for the mobile station when the measurement of the pilot signal emitted by the given target base station is above a threshold value.

11. The system of claim 9, wherein the program logic executable by the processing unit to determine whether to instruct a given target base station to pre-register a data path for the mobile station comprises:

program logic executable by the processing unit to (i) identify a quality-of-service (QoS) subscriber profile for the mobile station, and (ii) determine to instruct the given target base station to pre-register a data path for the mobile station when the QoS subscriber profile meets one or more predetermined criteria.

12. The system of claim 9, wherein program logic executable by the processing unit to determine whether to instruct a given target base station to pre-register a data path for the mobile station comprises:

program logic executable by the processing unit to (i) determine a likelihood that the mobile station will hand off to the given target base station, and (ii) determine to instruct the given target base station to pre-register a data path for the mobile station when the determined likelihood is above a threshold value.

13. The system of claim 9, wherein program logic executable by the processing unit to determine whether to instruct a given target base station to pre-register a data path for the mobile station comprises:
program logic executable by the processing unit to (i) determine a distance between the serving base station and the given target base station, and (ii) determine to instruct the given target base station to pre-register a data path for the mobile station when the distance between the serving base station and the given target base station is below a threshold value.

14. A method comprising:
a serving base station maintaining a record, wherein the record comprises (i) an identification of a target base station and (ii) a number of times mobile stations being served by the serving base station have handed off to the target base station;
receiving a message from a first mobile station, wherein the message comprises an indication that the first mobile station is handing off to the target base station; and
the serving base station updating the record;
the serving base station receiving a mobile-originated handoff-request message from a second mobile station, wherein the mobile-originated handoff-request message identifies the target base station; and
the serving base station responsively using the record to determine whether to instruct the target base station to pre-register a data path for the second mobile station.

15. The method of claim 14, wherein the serving base station using the record to determine whether to instruct the target base station to pre-register a data path for the second mobile station comprises:
the serving base station determining to instruct the target base station to pre-register a data path for the second mobile station when the record meets at least one specified criteria.

16. The method of claim 14, further comprising the serving base station sending a serving-to-target handoff-request message to the target base station, wherein the serving-to-target handoff-request message indicates whether the serving base station is instructing the target base station to pre-register a data path for the second mobile station.

17. The method of claim 14, wherein the serving base station responsively determining whether to instruct a given target base station to pre-register a data path for the mobile station comprises:
the serving base station determining a distance between the mobile station and the given target base station; and
the serving base station determining to instruct the given target base station to pre-register a data path for the mobile station when the distance between the mobile station and the given target base station is below a threshold value.

* * * * *